United States Patent [19]
Maruyama

[11] 4,389,106
[45] Jun. 21, 1983

[54] FOCUSING CONTROL DEVICE

[75] Inventor: Takashi Maruyama, Suwa, Japan

[73] Assignee: Chinon Kabushiki Kaisha, Nagano, Japan

[21] Appl. No.: 282,027

[22] Filed: Jul. 10, 1981

[30] Foreign Application Priority Data

Aug. 6, 1980 [JP] Japan .................... 55-107900

[51] Int. Cl.³ .............................................. G03B 3/10
[52] U.S. Cl. ....................................... 354/25; 352/140
[58] Field of Search ................. 354/25 R, 25 A, 25 P, 354/25 N, 31 F; 352/140; 358/227

[56] References Cited
U.S. PATENT DOCUMENTS 3,999,192  12/1976  Hosoe et al. ................... 354/25 A
4,251,145  2/1981   Cocron et al. ................. 354/25 A Primary Examiner—William B. Perkey
Attorney, Agent, or Firm—Gerald J. Ferguson, Jr.; Joseph J. Baker

[57] ABSTRACT

A focusing control device for a cine camera operates to displace the lens so that the lens is automatically and continuously focused on an object. The focusing control device is provided with circuitry to prevent displacement of the lens caused by the detection of an infinite focus condition unless the lens is out of the focusing tolerance range and the lens is in a front focusing condition.

4 Claims, 10 Drawing Figures

FOCUSING CONTROL DEVICE

BACKGROUND OF THE INVENTION

This invention relates to a focusing control device for a cine camera or the like, which operates to displace the lens so that the lens is automatically and continuously focused on an object, and more particularly to an improvement in such devices which prevents the useless displacement of the lens which is caused by the detection of an infinite focus condition.

An example of a focusing system to which the improvement according to the invention is applicable is shown in U.S. Pat. No. 4,251,145 to Cocron, et al.

In general, an automatic focusing device for a cine camera or the like has a pair of range finding elements which are displaced according to the amount of extension of the photographing lens. When light reflected from an object is equally applied to the pair of range finding elements, the lens is focused on the object. When the quantity of incident light to one of the range finding elements is different from that of incident light to the other range finding element, the lens is defocused, i.e. it is in a front focusing condition or in a rear focusing condition. Accordingly, the lens is moved in a direction so that it is focused on the object. In this case, the weaker output signals of the range finding elements are subjected to integration in order to increase the S/N ratio thereof. Until the integration has been accomplished, the lens moving motor is controlled according to the result of the preceding integration.

In the case where an object is infinitely distant, in an active type automatic focusing device as described above, the quantity of light which is reflected by the object and received by the range finding elements is substantially zero, and accordingly it is impossible to carry out the above-described integration. Accordingly, heretofore, when the integration is impossible, the focusing position of the lens is moved so that the lens is in the infinitely-distant-object photographing condition. However, if, in this case, there are backgrounds (such as the sky, mountains and clouds) at distant ranges although an object to be photographed is positioned near as shown in FIG. 3, the object is defocused. Furthermore, if a range finding light beam or the like is completely absorbed by an object, then similarly it is impossible to carry out the integration, and accordingly, the object is defocused. Moreover, in the case where a panning operation is carried out as shown in FIG. 4, the focusing point is varied frequently because there are different persons and backgrounds at different distances, and accordingly the resultant picture is unsatisfactory in quality.

SUMMARY OF THE INVENTION

Accordingly, an object of this invention is to provide a focusing control device which discriminates whether or not focusing is in a focusing tolerance range with which the resultant picture appears relatively sharp even though the focusing is not completely correct and the result of the discrimination is stored, and a direction in which the lens should be moved for focusing is determined and the result of the determination is stored, and in which these two results thus stored are renewed whenever the integration is suitably carried out, and when the integration is impossible the lens is moved to the infinitely-distant-object photographing position only under the condition that the results thus stored satisfy predetermined conditions, whereby the useless movement of the lens to the infinitely-distance-object photographing position is prevented and the production of a picture poor in quality due to defocusing and to the frequent variation of the focusing point is also prevented.

BRIEF DESCRIPTION OF THE DRAWINGS

The specific nature of the invention, as well as other objects, aspects, uses and advantages thereof, will clearly appear from the following description and from the accompanying drawings, in which.

DESCRIPTION OF THE PREFERRED EMBODIMENT

This invention will be described with reference to its preferred embodiment shown in the accompanying drawings.

Figure 1:
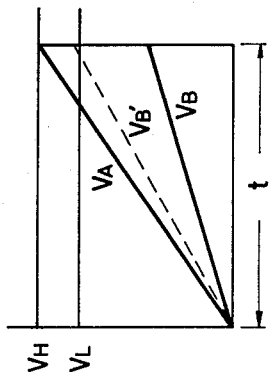
FIG. 1 is a graph useful in explaining the fundamental focusing discrimination operation of this invention.

First, the focusing determining principle in a range finding system to which the invention is applied will be described with reference to FIG. 1 wherein reference characters VA and VB designate integration values which are obtained by integrating signals which are outputted by range finding elements. More specifically, the data VA is the integration value of a system in which a large output is obtained in the case of a front focusing condition, and the data VB is the integration value of a system in which a large output is obtained in the case of a rear focusing condition. If, when the larger of these integration values VA and VB (or the value VA in the case of FIG. 1) reaches a predetermined threshold value VH, the smaller value (VB in the case of FIG. 1) reaches a predetermined low threshold value VL, then it is determined that the lens is in a focusing tolerance range; and if not, it is determined that the lens is out of the focusing tolerance range, i.e. it is out of focus. Thus, the lens is displaced in a direction in which the two integration values VA and VB coincide with each other; i.e., in this case the integration value VB is increased. For a period of time (t) which elapses for determining the direction and speed of displacement of the lens according to the above-described new integration result, the lens is displaced in the direction and at the speed which are determined according to the preceding integration result.

A preferred embodiment of the focusing control device will be described with reference to FIG. 2 wherein reference numerals 11 and 12 designate range finding elements which receive range finding light beams which are emitted from a light emitting element 10 and reflected by an object and provide output electrical signals corresponding to the incident light quantities. In the range finding element 11, the incident light quantity is large in the case of a front focusing condition, while in the range finding element 12 the incident light quantity is large in the case of a rear focusing condition. Integration circuits 13 and 14 integrate the output signals of the respective range finding elements 11 and 12 and provide output integration values VA and VB. In a group of comparators 16, the integration values VA and VB are compared with high and low threshold values VH and VL. More specifically, the group of comparators 16 comprises a comparator 17 for comparing the integration value VA with the threshold value VH, a comparator 18 for comparing the integration value VB with the threshold value VH, a comparator 19 for comparing the integration value VA with the threshold value VL, and a comparator 20 for comparing the integration value VB with the threshold value VL.

A direction discriminating and storing section 25 operates to receive the output signal $V_1$ of the comparator 17 or the output signal $V_2$ of the comparator 18 thereby to discriminate the direction of displacement of the photographing lens, i.e. to discriminate whether the lens is in the front focusing condition or in the rear focusing condition, and to store the discrimination result. The output signal $V_1$ of the comparator 17 is provided when the integration value VA is larger than the integration value VB, i.e., in the case of the front focusing condition. The output signal $V_1$ is applied through an OR gate 26 to an input terminal D of a D flip-flop 27. The output signal $V_1$ is further applied through an OR gate 28 to the set terminal S of an S-R flip-flop 29. The reset terminal R of the S-R flip-flop 29 is connected to the output terminal of the comparator 18, to receive the output signal $V_2$ which is provided when the integration value VA is smaller than the integration value VB, i.e., in the case of the rear focusing condition. Accordingly, the S-R flip-flop 29 stores the output signal $V_1$ or $V_2$, i.e., the front focusing condition or the rear focusing condition. The output signal $V_2$ is further applied to an input terminal D of another D flip-flop 30. An OR gate 31 operates to apply a trigger signal to the D flip-flops 27 and 30. The input terminals of the OR gate 31 are connected to the output terminals of the comparators 17 and 18. The output terminal of the OR gate 31 is connected through an OR gate 32 and a delay circuit 33 to the trigger terminals T of the two D flip-flops 27 and 30. Therefore, when the comparator 17 (or 18) provides the output signal $V_1$ (or $V_2$), the D flip-flop 27 (or 30) is triggered with a predetermined delay time to produce an output signal $Q_4$ (or $Q_3$).

The D flip-flop 27 or 30 applies a direction signal to the switching circuit 36 of a lens moving motor 35. The output signal $Q_4$ which is produced in the case of the front focusing condition is applied to the direction terminal FAR of the switching circuit 36 so that the motor 35 is rotated in one direction to cause the focus of the lens (not shown) to move away. On the other hand, the output signal $Q_3$ which is produced in the case of the rear focusing condition is applied to the direction terminal NEAR of the switching circuit 36 so that the motor 35 is rotated in the opposite direction to cause the focus of the lens to come near.

A focusing tolerance range discriminating and storing section 40 has an AND gate 41 and a D flip-flop 42. The input terminals of the AND gate 41 are connected to the output terminals of the comparators 19 and 20. When the AND gate 41 receives the output signals $V_3$ and $V_4$ of the comparators 19 and 20 which are produced when focusing of the lens is in the focusing tolerance range, it is placed in the "H" state. The input terminal D of the D flip-flop 42 is connected to the output terminal of the AND gate 41, so that, upon reception of a trigger signal (described later), the D flip-flop 42 stores the output state of the AND gate 41. More specifically, if the AND gate 41 is in the "H" state as described above, the flip-flop 42 stores the fact that the lens is in the focusing tolerance range, and if the AND gate 41 is in the "L" state, the flip-flop 42 stores the fact that the lens is out of the focusing tolerance range. The trigger terminal T of the D flip-flop 42 is connected to the output terminal of the OR gate 31, so that the D flip-flop 42 is triggered whenever the output signal $V_1$ or $V_2$ is provided. The output circuit of the D flip-flop 42 is so arranged as to provide an inverted output $\overline{Q_2}$. The D flip-flop 42 produces the inverted output $\overline{Q_2}$ only in the case where, when it is triggered as described above, no signal is applied to the input terminal D, i.e. only in the case where the lens focus is out of the focusing tolerance range.

Figure 2:
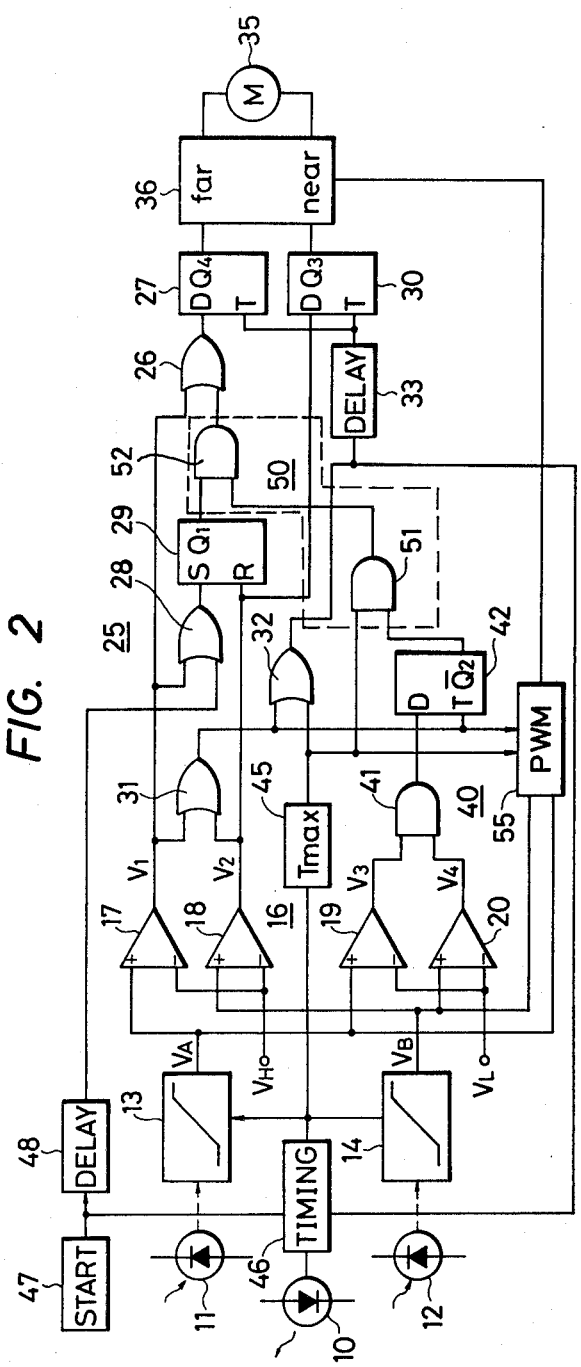
FIG. 2 is logic and block diagram showing one example of a focusing control device according to the invention.

In FIG. 2, reference numeral 45 designates a clock circuit for controlling the longest period of time in the above-described integration. The circuit 45 starts clocking in synchronization with the start of the integration in the integration circuits 13 and 14 with the aid of a signal from a timing circuit 46. The output terminal of the circuit 45 is connected to one input terminal of an AND gate 51 which forms an infinity focus discriminating section 50 (described later). That is, an output signal which is produced when a predetermined longest integration time has been clocked because of the impossibility of integration described before, is applied to the one input terminal of the AND gate 51. The output terminal of the clock circuit 45 is connected to the other input terminal of the OR circuit 32. Thus, the output which is provided when the longest integration time is clocked is applied, as the trigger signal, to the D flip-flops 27 and 30 through the delay circuit 33. The output terminal of the OR gate 32 is connected to the timing circuit 46. Therefore, the output which is provided when the longest integration time is clocked is applied through the timing circuit 46, as an integration stop signal, to the integration circuits 13 and 14, and, as a clocking releasing signal, to the clock circuit 45. When one of the integration values VA and VB in the two systems reaches the threshold value VH and the output signal $V_1$ or $V_2$ is produced, then the OR gate 32 is placed in the "H" state. Accordingly, if, even when the clock circuit 45 has not clocked the longest integration time yet, the OR circuit is placed in the "H" state as described above, the integration stop signal and the clocking releasing signal are provided through the timing circuit 46.

Upon reception of a start signal from a focusing instruction device (such as a start button) 47, the timing circuit 46 applies periodically integration instructions to the integration circuits 13 and 14, a clocking instruction to the clock circuit 45 and a light emission instruction to a light emitting element 10. It goes without saying that, in response to the output signal of the OR gate 32, the timing circuit 46 produces signals for stopping or releasing these instructions similarly as in the above-described case. The focusing instruction device 47 is connected through a delay circuit 48 and the OR gate 28 to the set terminal S of the S-R flip-flop 29. Therefore, when the focusing operation starts, the direction discriminating and storing section 25 is forced to store the front focusing condition by the S-R flip-flop 29.

The infinity focus discriminating section 50 (enclosed by dotted lines) has two AND gates 51 and 52. The AND gate 51 has one input terminal connected to the output terminal of the clock circuit 45 and the other input terminal connected to the output terminal $Q_2$ of the D flip-flop 42. Therefore, the AND gate 51 is placed in the "H" state when the clock circuit 45 clocks the longest integration time because of the impossibility of integration and the focusing tolerance range discriminating and storing section 40 stores the fact that the lens is out of the focusing tolerance range. The AND gate 52 has one input terminal connected to the output terminal $Q_1$ of the S-R flip-flop 29 and the other input terminal connected to the output terminal of the AND gate 51. The output terminal of the AND gate 52 is connected to the other input terminal of the OR gate 26. Therefore, the AND gate 52 is placed in the "H" state when there is an output from AND gate 51 and the direction discriminating and storing section 25 stores the front focusing condition. The output signal of the AND gate 52 is applied through the OR gate 26 to the input terminal D of the D flip-flop 27.

A pulse width determining circuit 55 receives the integration values VA and VB of the two systems, so as to determine and store a pulse width corresponding to the difference in level between the integration values. Whenever a signal is applied to the circuit 55 by the OR gate 31, the pulse width stored in the circuit 55 is replaced by a pulse width corresponding to new integration values VA and VB. When the output signal of the clock circuit 45 is applied to the circuit 55, the preceding pulse width is held in the circuit 55. The pulse width which is stored and renewed successively according to the degree of defocusing is applied to the switching circuit 36 to control the period of time during which the motor 35 is energized. More specifically, if the difference in level between the integration values VA and VB is large and the degree of defocusing is large, then the pulse width is increased to increase the period of time during which the motor 35 is energized. On the other hand, if the difference in level between the integration values VA and VB is small, the period of time during which the motor 35 is energized is decreased.

The operation of the circuit thus organized will be described. First, the operation will be described with reference to the case where an object at a relatively short range is photographed and the integration operation is carried out normally. When in response to the start signal from the focusing instruction device 47 the timing circuit 46 causes the light emitting element 10 to emit light, the range finding light beam reflected from the object is applied to the pair of range finding elements 11 and 12. The light beam thus applied is converted into electrical signals in the range finding elements 11 and 12. The electrical signals are applied to the integration circuits 13 and 14, where the integration values VA and VB are obtained from the electrical signals. The magnitudes of the integration values VA and VB are changed according to the degree of defocusing and to whether the lens is in the front focusing conditon or in the rear focusing condition. In the case of the front focusing condition, the percentage of increase of the integration value VA is larger; and in the case of the rear focusing condition, the percentage of increase of the integration value VB is larger. Accordingly, in the case of the front focusing condition, as shown in FIG. 1 the integration value VA reaches the threshold value VH earlier, and the comparator 17 produces the output signal $V_1$. The output signal $V_1$ is applied through the OR gate 28 to the set terminal S of the S-R flip-flop 29 to raise the level of the set terminal S to a high logical level (hereinafter referred to merely as "H", when applicable). Thus, the front focusing condition is stored in the direction discriminating and storing section 25. The output signal $V_1$ is further applied to the input terminal D of the D flip-flop 27, to raise the level of the input terminal D to "H". The output signal $V_1$ is further applied through the OR gate 31 to the pulse width width determining circuit 55, so that the pulse width stored therein is renewed to a pulse width corresponding to new integration values VA and VB, and the new pulse width is applied to the switching circuit 36. Furthermore, the output signal $V_1$ is applied through the OR gates 31 and 32 to the delay circuit 33. Accordingly, after the predetermined delay time, the levels of the trigger terminals T of the D flip-flops 27,30 are raised to "H". In this operation, only the D flip-flop 27 whose input terminal D is at "H" produces the output signal $Q_4$ which is applied to the switching circuit 36. Upon reception of the signal $Q_4$ and the signal from the pulse width determining circuit 55, the switching circuit 36 operates to rotate the motor 35 so that the focus of the lens is moved away according to the degree of defocusing, i.e. the difference between the integration values VA and VB.

Figure 3:
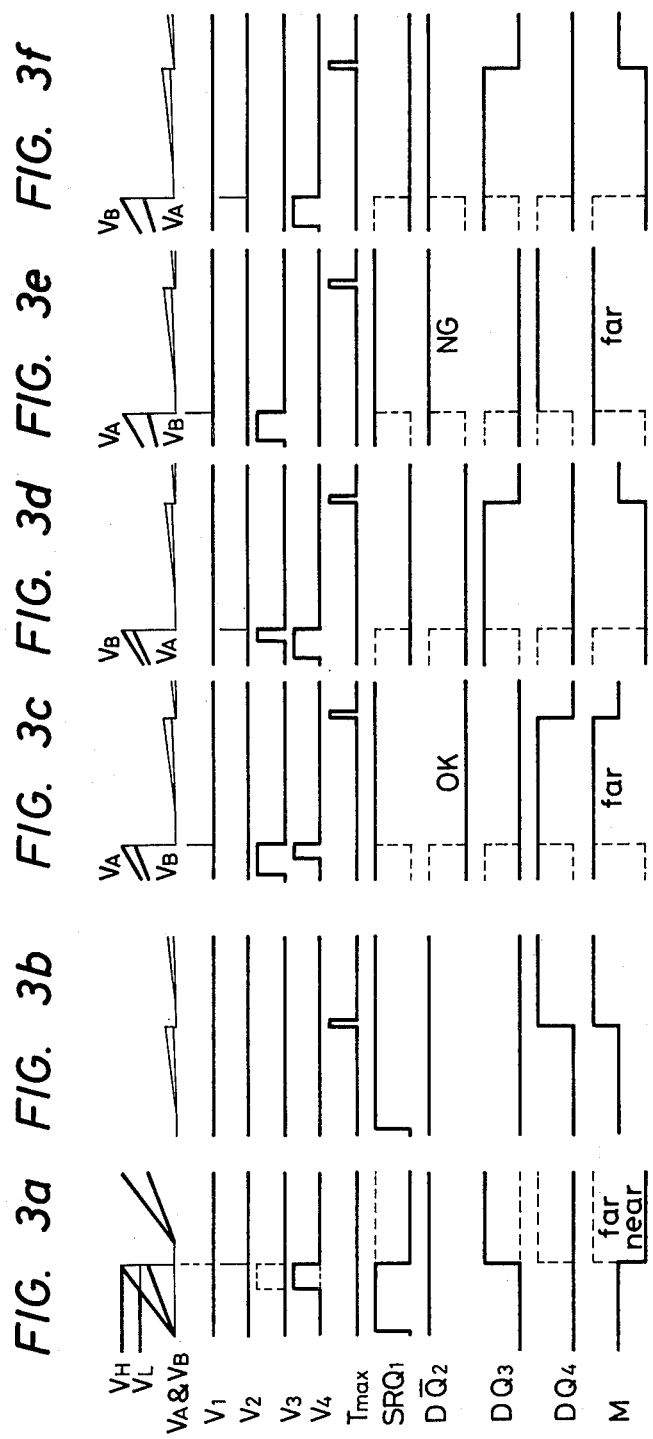
FIGS. 3a through 3f are time charts for describing the operation of the device shown in FIG. 2.

In the case of the rear focusing condition, the comparator 18 produces the output signal $V_2$, the level of the reset terminal R of the S-R flip-flop 29 is raised to "H", and the direction discriminating and storing section 25 stores the rear focusing condition. Furthermore, the level of the input terminal D of the D flip-flop 30 is raised to "H" by the signal $V_2$. The other operations are similar to those in the case of the front focusing condition; that is, the switching circuit 36 operates the motor 35 so that the focus of the lens is caused to come near. FIG. 3a is a time chart for illustrating the above-described operation wherein the solid lines indicates the case of the front focusing condition, and the broken lines indicates the case of the rear focusing condition.

Figure 4:
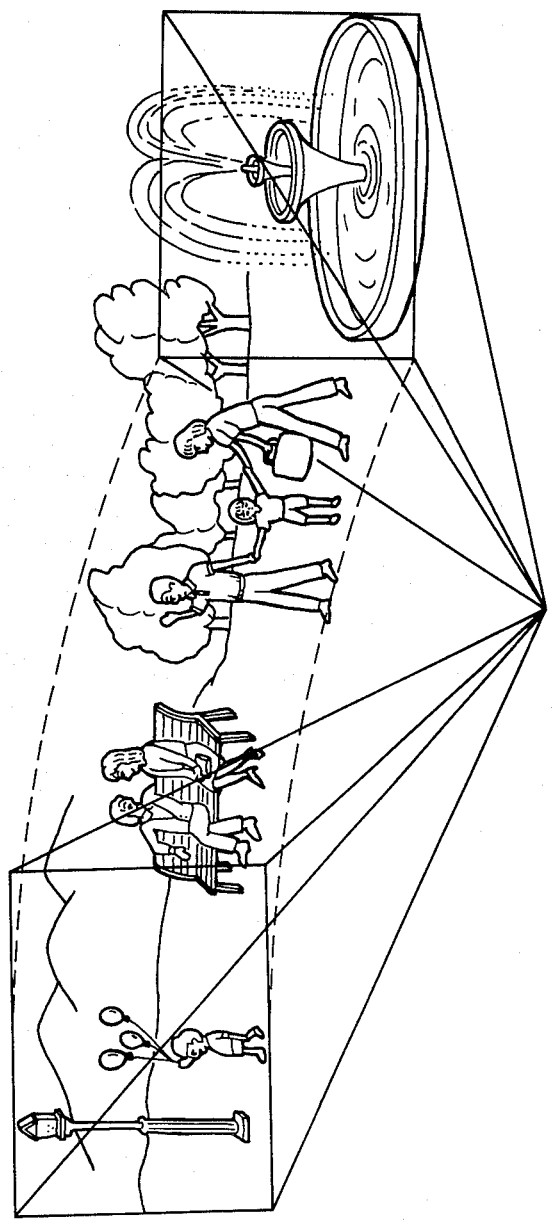
FIGS. 4 and 5 are explanatory diagrams for a description of difficulties experienced in the prior art.
Figure 5:
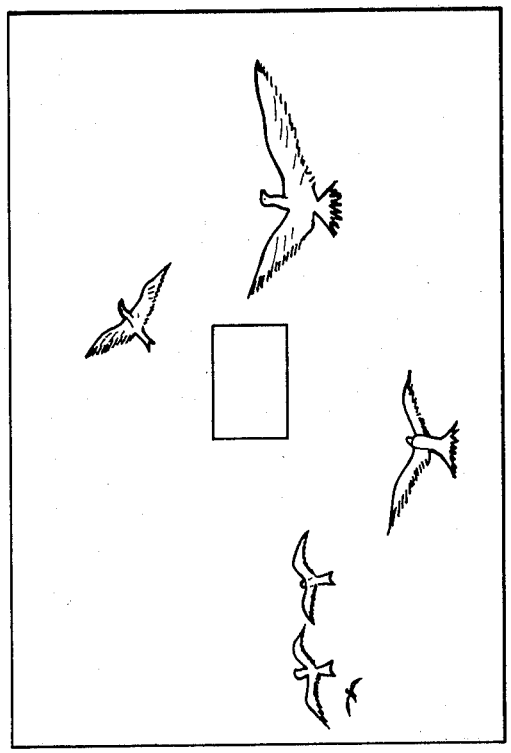

Now, the case where, during the above-described normal operation, the integration becomes impossible because of the reasons described with reference to FIG. 4 or 5 will be described. Four kinds of information can be obtained as the results of the integration in the normal operation described above: (1) the lens is in the focusing tolerance range with the front focusing condition (OK); (2) the lens is out of the focusing tolerance range with the front focusing condition (NG); (3) the lens is in the focusing tolerance range with the rear focusing condition (OK); and (4) the lens is out of the focusing tolerance range with the rear focusing condition (NG). In the invention, only where the above-described condition (2) is held when the integration becomes impossible, the lens is moved to the infinity focus position, and in the other conditions (1), (3) and (4), the lens is fixed at the position when the integration becomes impossible, so that the unnecessary displacement of the lens is prevented.

The time charts in FIGS. 3c, 3d, 3e, and 3f correspond to the above-described four conditions. In these time charts, the solid lines indicate the case where the result of the first preceding integration is the same as that of the second preceding integration, and the broken lines illustrate the case where the result of the first preceding integration is different from that of the second preceding integration. First, the case (1) mentioned above will be described with reference to the time chart in FIG. 3c. In the direction discriminating and storing section 25, the level of the set terminal S of the S-R flip-flop 29 is at "H", and the output $Q_1$ is produced and the front focusing condition is stored. As the lens is in the focusing tolerance range, both the integration values VA and VB have reached the low threshold value VL, and both the comparators 19 and 20 produce the output signals $V_3$ and $V_4$. Therefore, the AND gate 41 is placed in the "H" state, and the level of the input terminal D of the D flip-flop 42 is raised to "H". Therefore, the output condition of the D flip-flop 42 which has been triggered by the output signal of the OR gate 31 before the integration becomes impossible is such that the inverted output $\overline{Q_2}$ is at a low logical level (hereinafter referred to merely as "L", when applicable). Accordingly, even if the clock circuit 45 clocks the longest integration time because of the impossibility of integration and its output terminal is raised to "H", the level of the output terminal of the AND gate 51 is maintained at "L". Thus, even if the output $Q_1$ of the S-R flip-flop 29 is at "H", the output of the AND gate 52 is maintained at "L", and the level of the input terminal D of the D flip-flop 27 is also maintained at "L". Accordingly, the motor 35 is not rotated; that is, it is held at the position when the integration become impossible.

The conditions (3) and (4) will be described with reference to FIGS. 3d and 3f. As the rear focusing condition is held when the integration is impossible, the level of the reset terminal R of the S-R flip-flop 29 is at "H", and the output $Q_1$ is at "L". Accordingly, the output terminal of the AND gate 52 is at "L", and the input terminal D of the D flip-flop 27 is also at "L". Therefore, the motor 35 is not rotated, i.e. it is held at the position when the integration became impossible.

The condition (2) will be described with reference to FIG. 3e. In this case, the front focusing condition is held when the integration became impossible, and therefore the output $Q_1$ of the S-R flip-flop 29 is at "H". As the lens is out of the focusing tolerance range, the level of the output terminal of the AND gate 41 is at "L", and the level of the input terminal D of the D flip-flop 42 is also at "L". Accordingly, the inverted output $\overline{Q_2}$ of the D flip-flop 42 is raised to "H" after the D flip-flop 42 is triggered by the output signal of the OR gate 31 before the integration becomes impossible. Therefore, when the level of the output terminal of the clock circuit 45 is raised to "H" because of the impossibility of integration, the AND gate 51 is placed in the "H" state, and therefore the AND gate 52 is also placed in the "H" state. Thus, the level of the input terminal D of the D flip-flop 27 is raised to "H" through the OR gate 26. That is, the infinity focus discriminating section 50 has issued an instruction signal to move the lens to the infinity focus position. Thus, when the output of the clock circuit 45 is applied, as the trigger signal, to the D flip-flop 27 through the delay circuit 33, the output signal $Q_4$ is produced so as to rotate the motor in the forward direction thereby to move the lens to the infinity focus position.

The case where the first integration is impossible immediately after the start instruction is issued by the focusing instruction device 47, will be described with reference to the time chart shown in FIG. 3b. In this case, the start instruction is applied through the delay circuit 48 and the OR gate 28 to the set terminal S of the S-R flip-flop 29 to raise the level of the set terminal S to "H". That is, the direction discriminating and storing section 25 is forced to store a false front focusing condition. Therefore, similarly as in the above-described case, the motor 35 is rotated in the forward direction, to move the lens to the infinity focus position.

As is apparent from the above description, according to the invention, whether the defocus condition of an object's image is in the focusing tolerance range or belongs to the front focusing condition or the rear focusing condition is discriminated and stored by the normal integration operation. Therefore, when the integration is impossible, the lens moving motor is operated according to the above-described stored contents. Accordingly, even in the case where, although an object is in the frame as shown in FIG. 5, it is moving so fast that momentarily the range of the object cannot be measured, the trouble that the focusing position of the lens is greatly changed and accordingly the lens is defocused can be prevented. In the case of a panning operation also where near objects are photographed in a panoramic range, the focusing position is not greatly changed, and accordingly the resultant picture is satisfactory in quality. Furthermore, photographing a landscape or a scene can be achieved smoothly, because the start instruction can be issued merely by operating the start button.

What is claimed is:

1. In a lens focusing device of the type having first and second range finding elements for generating first and second signals, first and second integrator circuits respectively receiving said first and second signals and providing outputs relative to one another according to the state of focus, the output of said first integrator circuit being larger than the output of said second integrator circuit in the case of a front focusing condition and the output of said second integrator circuit being larger than the output of said first integrator circuit in the case of a rear focusing condition, and a direction discriminating and storing means responsive to the outputs of said first and second integrator circuits for determining the direction of movement of a lens, the improvement comprising the combination of focusing tolerance range discriminating and storing means responsive to the outputs of said first and second integrator circuits for determining whether or not focusing of said lens is within a focusing tolerance range, timing means for starting a clocking operation when the integration of said first and second integration circuits is started and stopping said clocking operation when the output of one of said first or second integration circuits reaches a predetermined threshold value, and infinity focus discriminating means responsive to said direction discriminating and storing means, said focusing tolerance range discriminating and storing means and said timing means for causing said lens to move to the infinity focus position when said clocking operation has clocked a predetermined longest integration time only under the conditions that said focusing tolerance range discriminating and storing means stores the fact that focusing of said lens is out of a focusing tolerance range and said direction discriminating and storing means stores the fact that said lens is in a front focusing condition.

2. The lens focusing device recited in claim 1 having the further improvement of start means for producing a focusing start signal, said direction discriminating and storing means being further responsive to said focusing start signal for storing the fact that said lens is in a front focusing condition.

3. The lens focusing device recited in claim 1 wherein said direction discriminating and storing means comprises
- first and second comparator circuits responsive respectively to the outputs of said first and second integrator circuits for comparing said outputs with a first threshold value, the output states of said first and second comparator circuits changing from a low value to a high value when the corresponding input thereof exceeds said first threshold value,
- a first flip-flop enabled by the output state of said first comparator circuit being at said high value and a second flip-flop enabled by the output state of said second comparator circuit being at said high value,
- delay trigger means for providing a delayed trigger pulse to said first and second flip-flops whenever the output state of either of said first or second comparator circuits changes to a high value, said timing means also being responsive to the change of the output state of either of said first or second comparator circuits to a high value to stop said counting operation, said first and second flip-flops providing direction command signals when triggered to cause said lens to move away or come near, respectively, and
- a third flip-flop set by the change of state of said first comparator circuit to a high value and reset by the change of state of said second comparator circuit to a high value, said third flip-flop storing in its set state the fact that said lens is in a front focusing condition,
- and wherein said focusing tolerance range discriminating and storing means comprises
- third and fourth comparator circuits responsive respectively to the outputs of said first and second integrator circuits for comparing said outputs with a second threshold value lower than said first threshold value, the output states of said third and fourth comparator circuits changing from a low value to a high value when the corresponding input thereof exceeds said second threshold value,
- a first AND gate connected to the outputs of said third and fourth comparator circuits,
- a fourth flip-flop enabled by an output from said first AND gate and triggered by the change of the output state of either of said first or second comparator circuits to a high value, said fourth flip-flop storing in its untriggered state the fact that focusing of said lens is out of a focusing tolerance range, and
- wherein said infinity focus discriminating means comprises AND gate means connected to the true and complement outputs of said third and fourth flip-flops and a maximum time signal from said timing means for enabling said first flip-flop, said delay trigger means also being responsive to said maximum time signal for providing a delayed trigger pulse to said first flip-flop.

4. The lens focusing device recited in claim 3 further comprising start means for producing a focusing start signal, said third flip-flop being set by said focusing start signal.

* * * * *